US008965446B2

(12) United States Patent
Kwon et al.

(10) Patent No.: US 8,965,446 B2
(45) Date of Patent: Feb. 24, 2015

(54) METHOD AND APPARATUS FOR REDUCING CONSUMPTION OF TRANSMISSION POWER IN BASE STATION BY ADJUSTING TRANSMISSION INTERVAL OF CONTROL SIGNAL

(75) Inventors: Kibum Kwon, Ansan-si (KR); Sungjin Suh, Seoul (KR); Kyoungmin Park, Goyang-si (KR)

(73) Assignee: Pantech Co., Ltd., Seoul (KR)

( * ) Notice: Subject to any disclaimer, the term of this patent is extended or adjusted under 35 U.S.C. 154(b) by 290 days.

(21) Appl. No.: 13/522,265

(22) PCT Filed: Jan. 10, 2011

(86) PCT No.: PCT/KR2011/000139
§ 371 (c)(1),
(2), (4) Date: Jul. 13, 2012

(87) PCT Pub. No.: WO2011/087240
PCT Pub. Date: Jul. 21, 2011

(65) Prior Publication Data
US 2012/0322445 A1 Dec. 20, 2012

(30) Foreign Application Priority Data

Jan. 14, 2010 (KR) ........................ 10-2010-0003346

(51) Int. Cl.
*H04B 7/00* (2006.01)
*H04B 1/38* (2006.01)
*H04W 52/04* (2009.01)
*H04W 52/32* (2009.01)
*H04W 52/02* (2009.01)

(52) U.S. Cl.
CPC ............ *H04W 52/04* (2013.01); *H04W 52/325* (2013.01); *H04W 52/0206* (2013.01); *Y02B 60/50* (2013.01)

USPC ........................................... 455/522; 455/561

(58) Field of Classification Search
USPC .............. 455/436–442, 522, 450, 452.1, 524, 455/418–420, 561; 370/331
See application file for complete search history.

(56) References Cited

U.S. PATENT DOCUMENTS 7,599,319 B2 * 10/2009 Kondou et al. ................ 370/318
8,160,589 B2 * 4/2012 Kuwahara ...................... 455/440
(Continued)

FOREIGN PATENT DOCUMENTS

| KR | 10-2007-0118248 | 12/2007 |
| KR | 10-2009-0030760 | 3/2009 |
| WO | 2006-038066 | 4/2006 |

OTHER PUBLICATIONS

International Search Report of PCT/KR2011/000139 dated Sep. 29, 2011.

*Primary Examiner* — Brandon Miller
(74) *Attorney, Agent, or Firm* — H.C. Park & Associates, PLC

(57) ABSTRACT

A method for reducing the consumption of the transmission power in the base station by adjusting the transmission interval between the control signals comprises the steps of: changing the interval between the control signals transmitted from the base station from a first interval to a second interval and transmitting the control signal; receiving a first message including transmission interval adjustment request information of the control signal; and changing the interval between the control signals to the first interval and transmitting the control signal.

23 Claims, 9 Drawing Sheets

(56) References Cited

U.S. PATENT DOCUMENTS

| | | | |
|---|---|---|---|
| 8,630,650 B2* | 1/2014 | Lee | 455/444 |
| 2006/0040669 A1* | 2/2006 | Innami | 455/442 |
| 2006/0203709 A1 | 9/2006 | Laroia et al. | |
| 2007/0066273 A1* | 3/2007 | Laroia et al. | 455/343.2 |
| 2010/0173630 A1* | 7/2010 | Han et al. | 455/433 |
| 2010/0254275 A1 | 10/2010 | Kang et al. | |

* cited by examiner

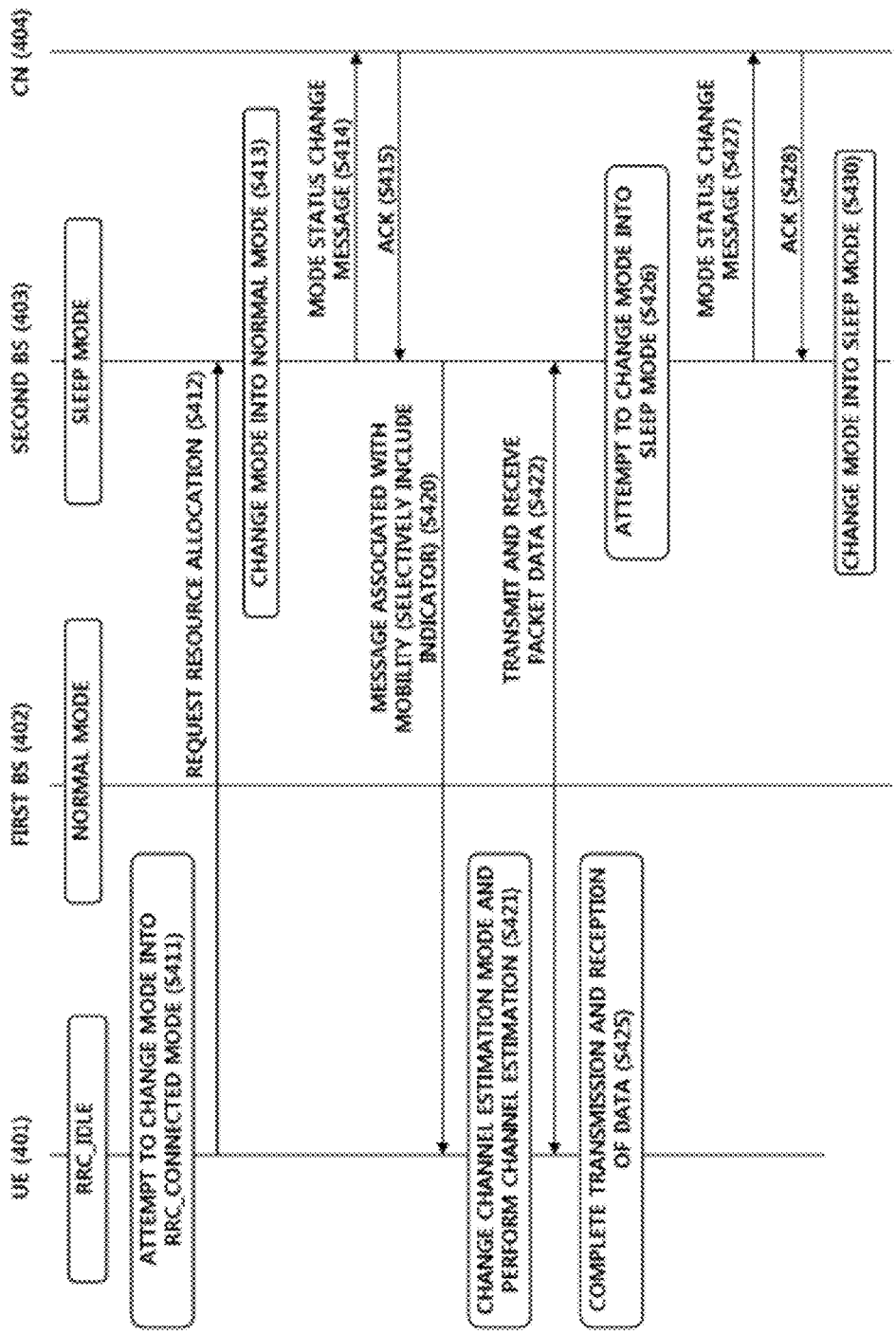

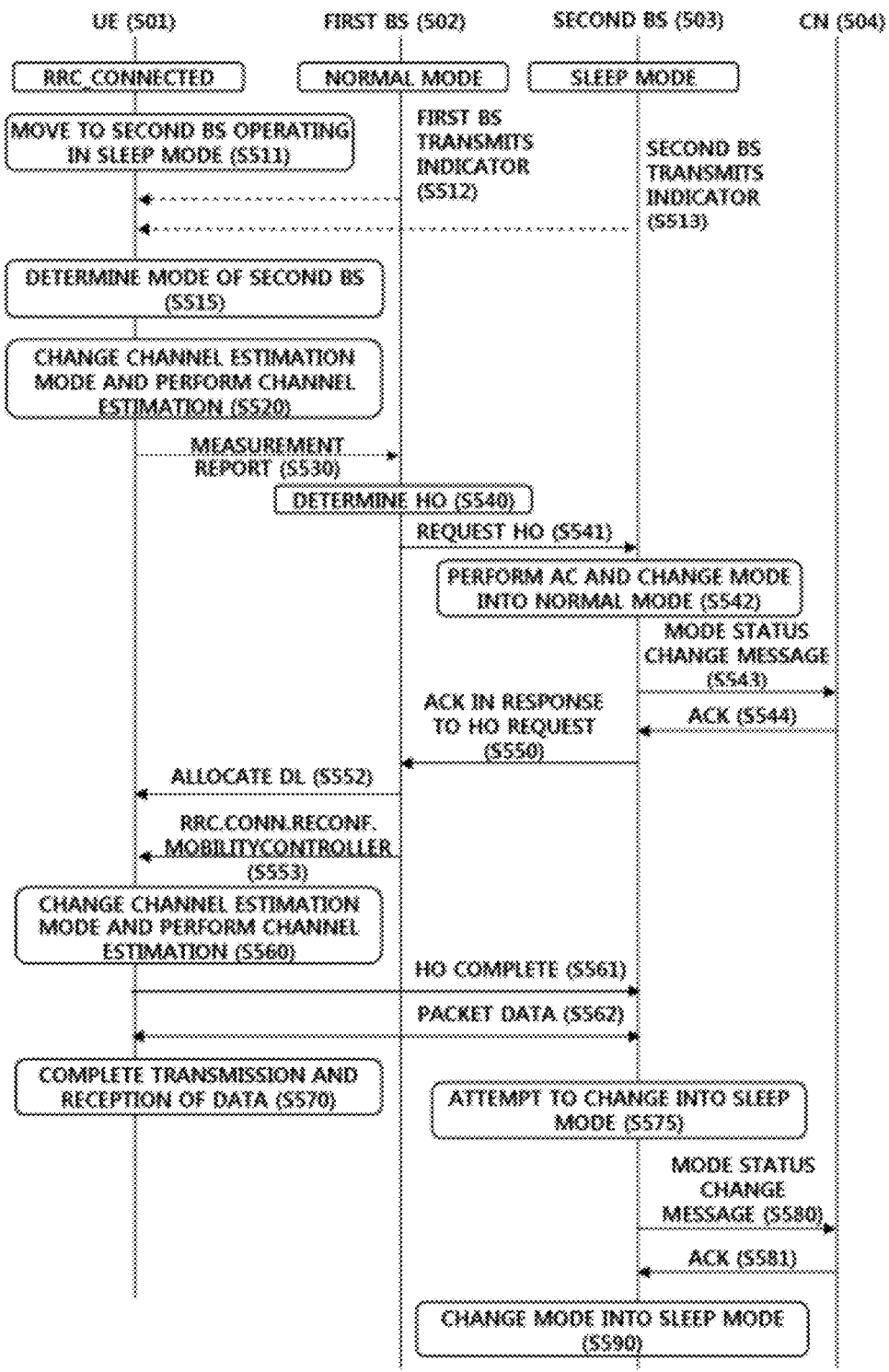

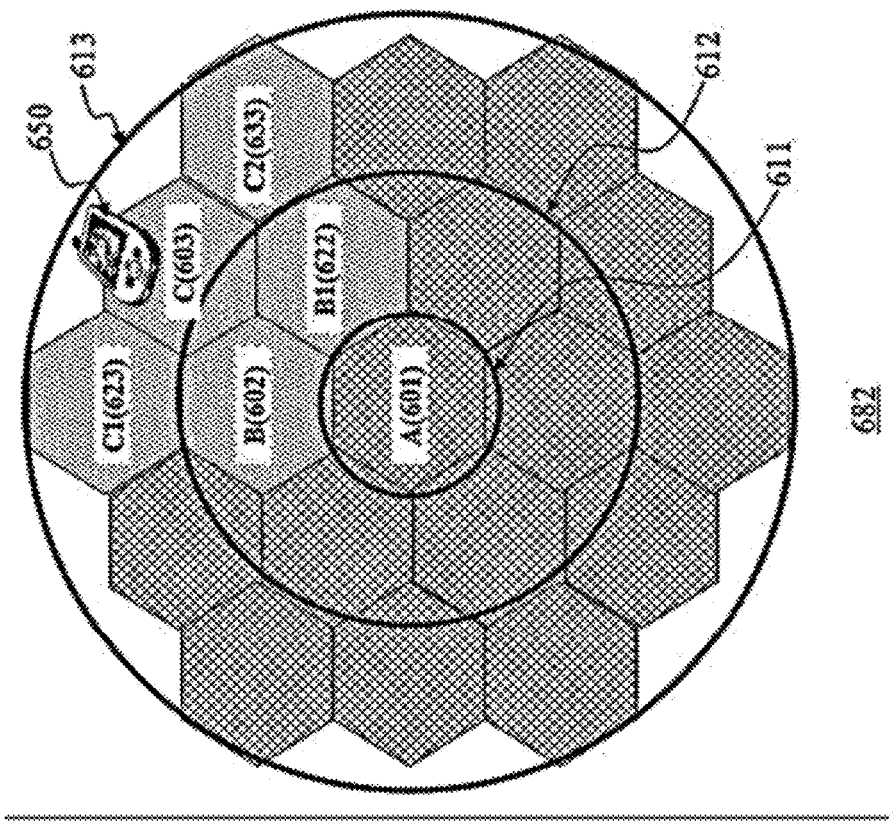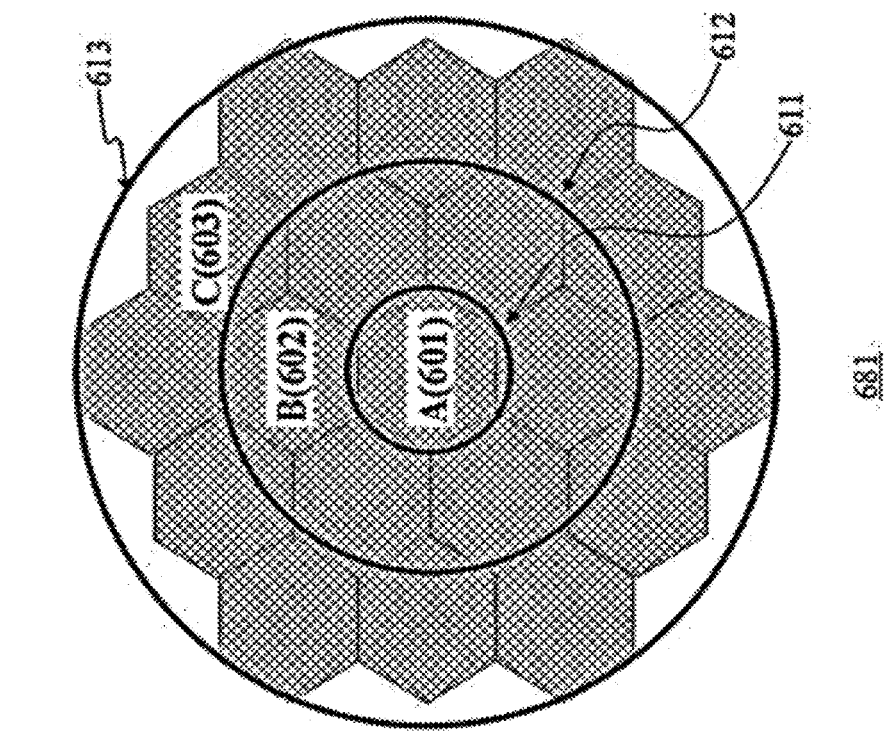

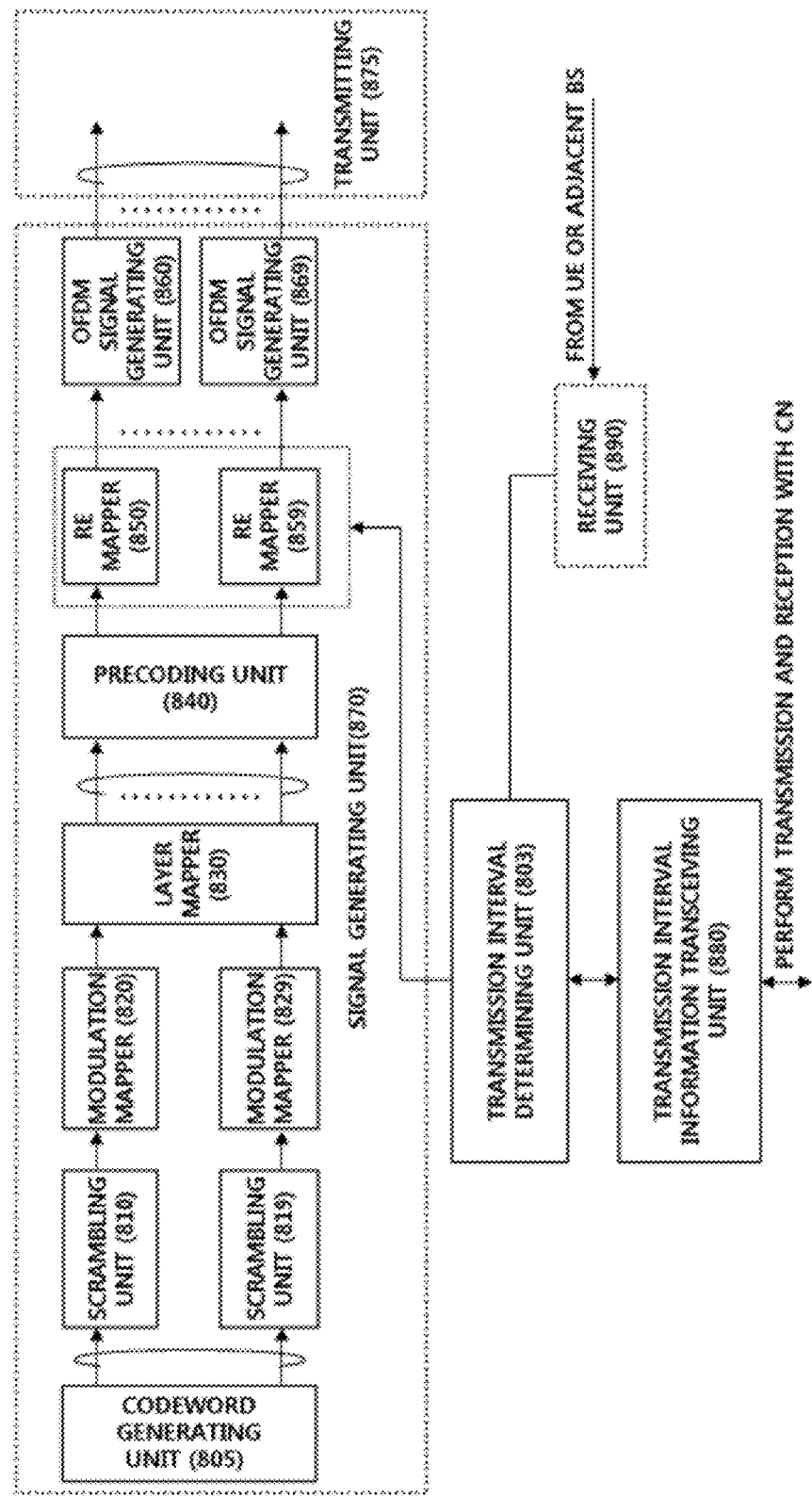

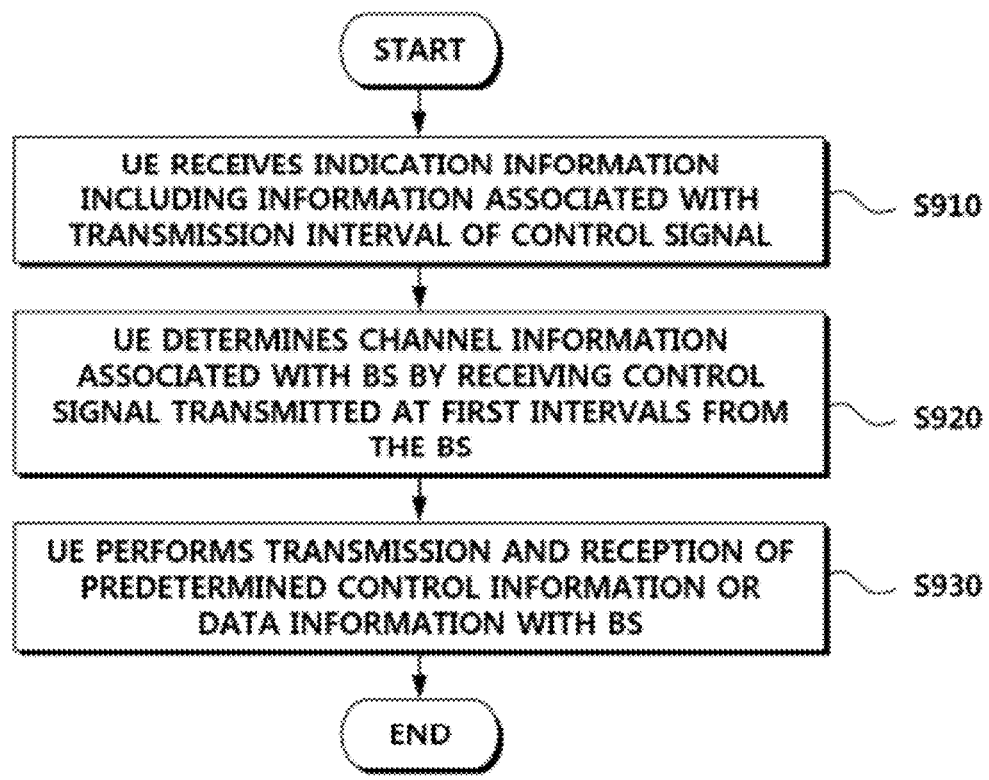

METHOD AND APPARATUS FOR REDUCING CONSUMPTION OF TRANSMISSION POWER IN BASE STATION BY ADJUSTING TRANSMISSION INTERVAL OF CONTROL SIGNAL

CROSS-REFERENCE TO RELATED APPLICATIONS

This application is the National Stage Entry of International Application No. PCT/KR2011/000139, filed on Jan. 10, 2011 and claims priority from and the benefit of Korean Patent Application No. 10-2010-0003346, filed on Jan. 14, 2010, all of which are hereby incorporated by reference for all purposes as if fully set forth herein.

BACKGROUND

1. Field

The present disclosure relates to a method and apparatus for reducing transmission power consumption of a base station (BS) by adjusting a transmission interval of a control signal.

2. Discussion of the Background

Recently, a green IT concept has come to the front in consideration of environmental matters, and a discussion about the introduction of green IT in a mobile communication environment is in progress. The most important issue in the discussion is to reduce power consumption of devices such as a base station (BS) and a user equipment (UE). A conventional mobile communication environment has attempted to reduce the power consumption by controlling power of a UE. However, a discussion about a BS that causes a large amount of power consumption has been lacking and associated technologies have not been accumulated.

SUMMARY

Controlling of power of a base station (BS) may significantly affect the implementation of green IT. Therefore, the present invention has been made in view of the above-mentioned problems, and an aspect of the present invention is to provide a method of effectively controlling power of a BS. Also, the transmission and reception performed by the UE with the BS may need to be adjusted in consideration of the power controlling.

Another aspect of the present invention is to provide a method of controlling a transmission power of a BS when a plurality of BSs are superposed to each other.

Another aspect of the present invention is to provide a method of controlling a transmission power of a BS when a plurality of BSs are adjacent to each other.

In accordance with an aspect of the present invention, there is provided a method of reducing transmission power consumption in a base station (BS) by adjusting a transmission interval of a control signal, the method including: transmitting, by the BS, the control signal at second intervals by changing the transmission interval of the control signal from a first interval into a second interval that is longer than the first interval; receiving a first message including information that requests adjusting of the transmission interval of the control signal; and transmitting the control signal at the first intervals by changing the transmission interval into the first interval.

In accordance with another aspect of the present invention, there is provided a method of receiving a control signal of which a transmission interval is adjusted to a first interval or to a second interval that is longer than the first interval, from a BS, the method including: receiving, by a user equipment (UE), indication information including information associated with the transmission interval of the control signal; determining channel information associated with the BS by receiving, from the BS, the control signal transmitted at the first intervals; and performing transmission and reception of predetermined control information or data information with the BS.

In accordance with another aspect of the present invention, there is provided a BS that reduces transmission power consumption by adjusting a transmission interval of a control signal, the BS including: a transmission interval determining unit to determine the transmission of the control signal at first intervals or second intervals; a signal generating unit to generate the control signal at the transmission intervals determined by the transmission interval determining unit; a transmitting unit to transmit the generated signal; a transmission interval information transceiving unit to transmit, to a core network (CN) that controls the BS, information associated with changing of the transmission interval of the control signal, determined by the transmission interval determining unit, through a mode change request message indicating that the BS is to change the transmission interval of the control signal, and to receive a response message from the CN in response to the message; and a receiving unit to receive a first message including information that requests adjusting of the transmission interval of the control signal, and the transmission interval determining unit changes the transmission interval of the control signal into the first interval when the receiving unit receives the first message.

In accordance with another aspect of the present invention, there is provided a method of reducing transmission power consumption of a BS by adjusting a transmission interval of a control signal, the method including: transmitting, by the BS, the control signal at second intervals; and proceeding with cell re-selection with a user equipment (UE) that determines the control signal that is being transmitted, and the BS transmits the control signal based on one of a first interval and a second interval that is longer than the first interval.

In accordance with another aspect of the present invention, there is provided a method of reducing transmission power consumption in a BS by adjusting a transmission interval of a control signal, the method including: transmitting, by the BS, the control signal at second intervals; receiving a message that requests resource allocation, from a UE; transmitting, to a CN that controls the BS, a mode change request message including information associated with changing of the transmission interval of the control signal; receiving, from the CN, a response message in response to the mode change request message; transmitting the control signal at first intervals; and performing transmission and reception of packet data with the UE, and the second interval is longer than the first interval.

In accordance with another aspect of the present invention, there is provided a method of reducing transmission power consumption in a BS by adjusting a transmission interval of a control signal, the method including: transmitting, by the BS, the control signal at second intervals; receiving a message that requests a handover from a second BS that connects with a UE; transmitting, to a CN that controls the BS, a mode change request message including information associated with changing of the transmission interval of the control signal; receiving, from the CN, a response message in response to the mode change request message; transmitting the control signal at first intervals; transmitting, to the second BS, a response message in response to the message that requests the handover; completing the handover with the UE;

and performing transmission and reception of packet data with the UE, and the second interval is longer than the first interval.

BRIEF DESCRIPTION OF THE DRAWINGS

FIG. 4 is a diagram illustrating a process in which a UE that connects with a BS that operates in a sleep mode changes a connection mode into an RRC_connected mode according to an embodiment of the present invention;

FIG. 5 is a diagram illustrating a process in which a UE 501 proceeds with a handover to a BS that operates in a sleep mode according to an embodiment of the present invention;

FIG. 6 is a diagram illustrating an example of changing modes of BSs according to another embodiment of the present invention;

FIG. 8 is a diagram illustrating an architecture in which a BS generates and transmits control information according to an embodiment of the present invention; and FIG. 9 is a diagram illustrating a functional process when channel estimation infrequently occurs in a UE according to an embodiment of the present invention.

DETAILED DESCRIPTION OF THE ILLUSTRATED EMBODIMENT

Figure 1:
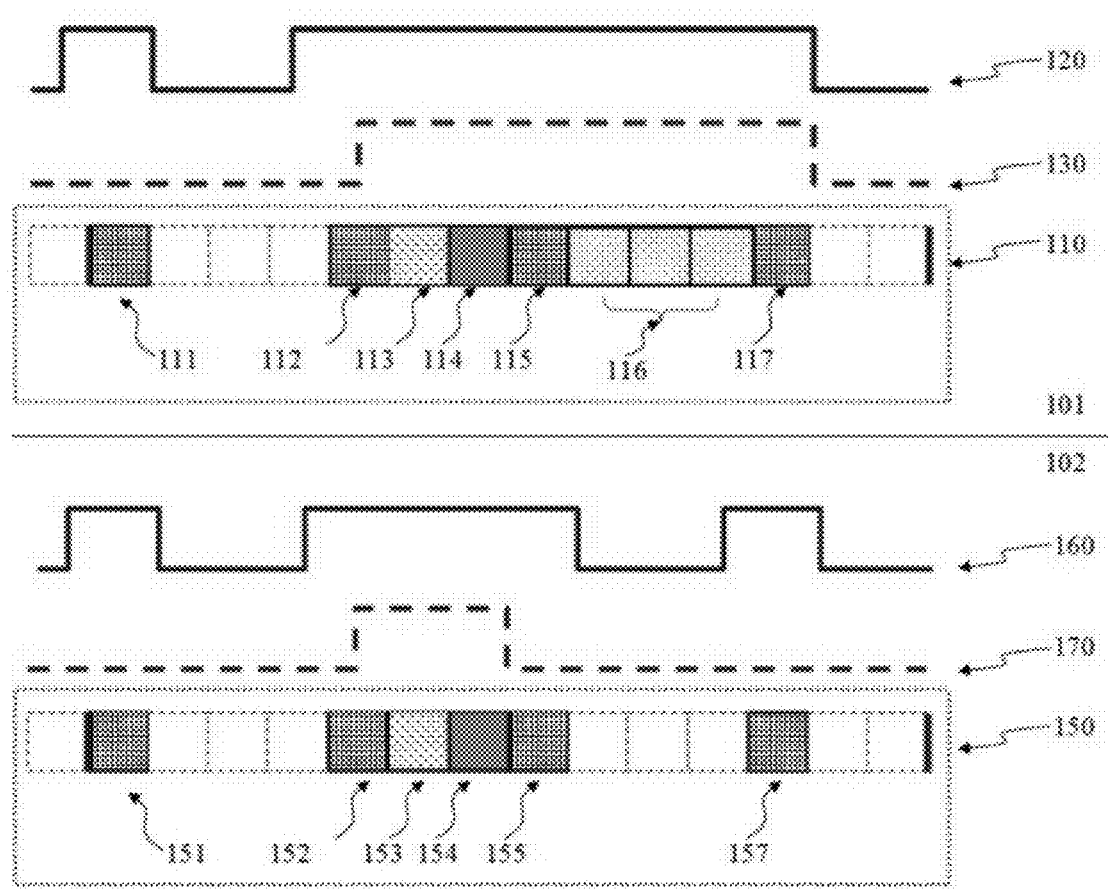
FIG. 1 is a diagram illustrating comparison between transmission of a control signal and transmission of a control signal of which a portion is omitted.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The specifications will describe a wireless communication network, and operations performed in the wireless communication network may be performed in a process in which a system (for example, a base station (BS)) that manages the corresponding wireless communication network controls the network and transmits data, or may be performed in a user equipment (UE) that connects with the corresponding wireless network.

A wireless communication system may be widely installed so as to provide various communication services, such as a voice service, packet data, and the like. The wireless communication system may include a UE and a BS. The UE and the BS may use various power allocation methods, which will be described in the following embodiments of the present invention.

In the specifications, the UE may be an inclusive concept indicating a user terminal utilized in wireless communication, including a UE in WCDMA, Long Term Evolution (LTE), LTE-Advanced, HSPA, and the like, and a mobile station (MS), a user terminal (UT), a subscriber station (SS), a wireless device and the like in GSM.

The eNB or a cell may refer to a fixed station where communication with the UE is performed, and may also be referred to as a Node-B, an evolved Node-B (eNB), a base transceiver system (BTS), an access point, and the like.

The eNB or the cell may be construed as an inclusive concept indicating a portion of an area covered by a base station controller (BSC) in CDMA, a NodeB and the like in WCDMA, and the concept may include various coverage areas, such as a megacell, a macrocell, a microcell, a picocell, a femtocell, and the like.

In the specifications, the UE and the eNB are used as two inclusive transceiving subjects to embody the technology and technical concepts described in the specifications, and may not be limited to a predetermined term or word.

A multiple access scheme applied to the wireless communication system may not be limited. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like.

Uplink (UL) transmission and downlink (DL) transmission may be performed based on a time division duplex (TDD) scheme that performs transmission based on different times, or based on a frequency division duplex (FDD) scheme that performs transmission based on different frequencies.

An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. Embodiments of the present invention may not be limited to a specific wireless communication scheme, and may be applicable to all technical fields to which a technical idea of the present invention is applicable.

In the specifications, a sleep mode may refer to a mode (including zero power transmission) that reduces a transmission power in a BS at regular intervals or at a prearranged point in time, so as to reduce power consumption of the BS. To embody the sleep mode, the BS may extend a transmission interval of a control signal based on a current cell condition or may selectively transmit a required control signal from among control signals to be transmitted.

A normal mode may refer to a mode that increases a transmission power to be higher than the sleep mode in the BS, and that transmits all control signals that need to be transmitted at a prearranged point in time or at regular intervals.

The transmission interval of the control signal may be classified into two or more types, and a case of a long transmission interval of the control signal may include the sleep mode. Also, a case of a short transmission interval may include the normal mode. Hereinafter, the present invention will be described in terms of the sleep mode and the normal mode as an embodiment. The embodiments of the present invention may include all embodiments that extend the transmission interval of the control signal, including a case of not transmitting a control signal during a predetermined period of time.

An embodiment of the present invention may reduce power consumption in a corresponding BS, when a user does not exist or when a UE is in a state of not transceiving data.

Also, according to embodiments of the present invention, an amount of power consumed in the BS may be minimized by minimizing a signal transmitted from the BS. When data to be transmitted and received exist in the UE while power consumption is maintained to be minimal, a mode may be effectively changed and thus, data may be transmitted without deterioration of performance.

In the specifications, a discontinuous transmission (DTX) scheme may refer to a scheme that decreases a transmission power of a signal (including zero power) when signal transmission is unnecessary while the BS performs signal transmission, and may maintain power to be zero (zero power) at a predetermined point in time. Also, an enhanced DTX (eDTX) scheme may refer to an enhanced scheme of the DTX scheme. The eDTX scheme may include a scheme that decreases a transmission power and transmits the decreased transmission power when a UE does not exist in a cell, and may be applicable when the UE inactively performs data transmission and reception although the UE exists.

FIG. 1 illustrates comparison between transmission of a control signal and transmission of a control signal of which a portion is omitted according to an embodiment of the present invention. In an LTE system or an LTE-A system, a control signal may be transmitted in a predetermined subframe (for example, a subframe 0 and a subframe 5) so that a UE may determine information associated with a cell.

101 shows an example 120 of transmission of a general control signal and an example 130 of transmission of a control signal of which a portion is omitted, in subframe #0 (subframe 0) 110.

The subframe 0 110 may show a first type format of a subframe through which a BS transmits data to the UE. Signals 111, 112, 115, and 117 may be signals for channel estimation, for example, a cell-specific reference signal (CRS). Signals 113 and 114 may be signals required for synchronization, and may enable estimation of synchronization. An example of the signal 113 may include a primary synchronization signal (PSS). An example of the signal 114 may include a secondary synchronization signal (SSS). In addition, a symbol 116 to be used for a broadcasting channel may be included in subframe #0.

When the entire control signal is transmitted through subframe #0 110, transmission may be performed in the same manner as the example 120.

Conversely, when a user does not exist in subframe #0 110, a signal for channel estimation, for example, CRSs 111, 112, 115, and 117 may be unnecessary. However, channel estimation signals 115 and 117 placed in both sides of a symbol associated with the broadcasting channel may be maintained, so as to perform decoding of the broadcasting channel. In this example, when the user does not exist in subframe #0 110, signals 111 and 112 may not be transmitted, as shown in the example 130, so as to embody an eDTX scheme.

102 shows an example 160 of transmission of a general control signal and an example 170 of transmission of a control signal of which a portion is omitted, in subframe #5 (subframe 5) 150.

Unlike 101, a symbol for a broadcasting channel does not exist in 102 and thus, examples of a signal for channel estimation may include only CRS 151, 152, and 157. A PSS 153 and an SSS 154, that is, examples of a signal for synchronization estimation, may be included in the subframe.

A graph 160 may show a general transmission power of the subframe #5 150. However, the UE does not exist and a signal for channel estimation may not be required and thus, the eDTX that does not perform separate transmission in 151, 152, 155, and 157 may be embodied, as shown in the example 170.

When the eDTX is embodied, information associated with whether the UE exists and a mode of the UE may be required. A transmission power of the BS may be controlled based on the mode of the UE and existence of the UE and thus, the power consumption in the BS may be reduced.

Figure 2:
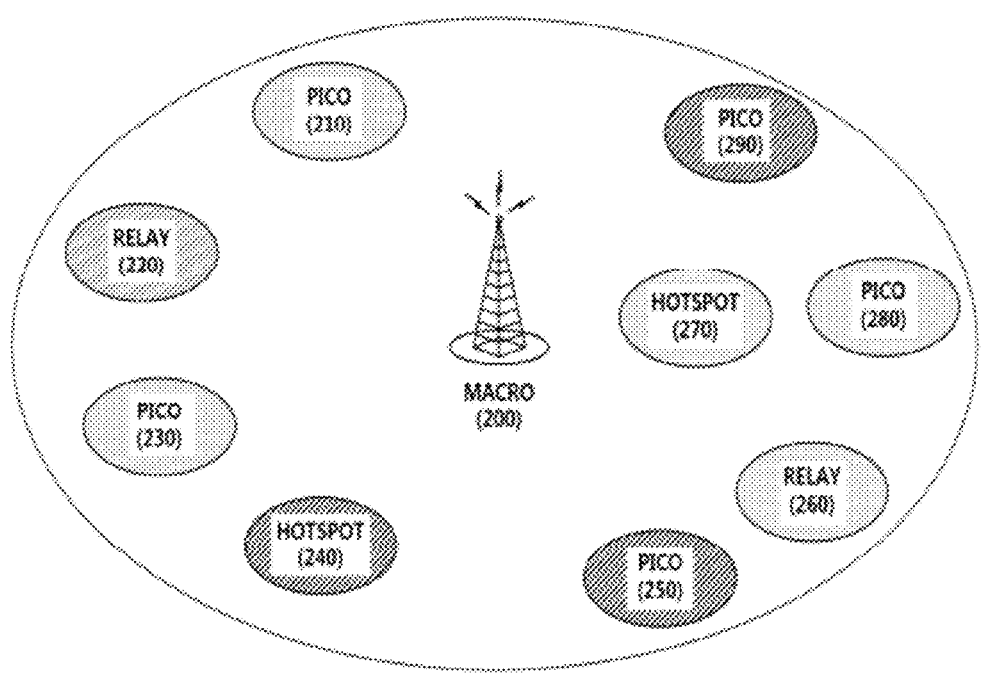
FIG. 2 a diagram illustrating a configuration of base stations (BSs) that embody eDTX according to an embodiment of the present invention.

FIG. 2 illustrates a configuration of BSs that embody eDTX according to an embodiment of the present invention.

Referring to FIG. 2, when a macro cell 200 including a macro BS and micro cells 210, 220, 230, 240, 250, 260, 270, 280, and 290 including micro BSs exist together, the micro cells may exist within a range covered by a control signal of the macro cell. Micro cells 220, 240, 250, and 290 that are marked by a diagonal pattern operate in a normal mode, and cells 210, 230, 260, 270, and 280 that are marked by a dot pattern operate in a sleep mode.

When a plurality of cells exist to be superposed, or cells exist to be adjacent to each other, a handover may occur by movement of a UE. Based on whether a mode of a cell that newly connects with the UE during the handover process is the normal mode or the sleep mode, the UE may variously operate. Also, the BS may provide various functions so as to provide the sleep mode.

To embody eDTX according to an embodiment of the present invention, the BS may have information associated with existence of the UE (information associated with whether the UE exists) or information associated with a mode of the UE (information associated whether the UE transmits and receives packet data). Also, according to an embodiment of the present invention, the UE may perform connection through a handover, or may have information associated with a mode of a currently connected BS. A micro BS that takes charge of a corresponding micro cell may have the information. Also, a macro BS that has an area superposed on an area of the micro BS may have the information, or a core network (CN) may maintain the corresponding information. Referring to FIGS. 4 and 5, the BS may transmit a message that requests changing of a mode to the CN. In this process, the CN may update and maintain information associated with a current mode of each BS. Also, the CN may control changing of a mode of a BS by sending a response that allows or disallows changing of a mode to each BS.

To transfer the information associated with the existence of the UE or the information associated with the mode of the UE, or to collect, actively by the BS, the information associated with the existence of the UE or the information associated with the mode of the UE, updating of a tracking area (TA) may be performed. This may be a method for determining whether the UE exists in a cell. Based on the TA information, the CN may determine where the UE is located. Through this information, whether the UE exists in a predetermined cell may be determined.

When a location of the UE is recognized based on a TA, the location of the UE may be recognized by updating the TA. In this example, only the TA is dependable. However, it is not guaranteed that the TA is updated every time that the UE moves from one cell to another, since the TA is updated based on a predetermined timer according to an embodiment that embodies the TA.

When the UE does not leave a cell, and the UE enters a cell where the UE does not exist and needs to trigger the cell operating in the sleep mode to normally operate, there may be a problem even through the TA is updated at an accurate point in time. In the cell operating in the sleep mode, a signal that may be measured by the UE may be insufficiently transmitted and thus, the UE may have difficulty in accurately recognizing a cell (a target cell) with which the UE is to be connected and may fail to proceed with a handover (HO) to the target cell.

Therefore, according to an embodiment that provides a method of collecting the information associated with the existence of the UE or the information associated with a mode of the UE without updating of the TA information, when the UE has a change such as, connecting with or leaving from the BS, changing a mode, and the like, the UE may transfer the information to the BS. That is, this method may be applicable when the mode information of the UE is not transferred in real time or within a short period of time by the updating of the TA. Also, a method that transfers the information associated with the change of the UE to another BS or the CN, and later on, the other BS or the CN transfers the information to a corresponding BS.

According to an embodiment of the present invention to embody exchanging mode information between the BS and the UE, the UE may transmit indication information (or an indicator) indicating whether a current mode of the BS is a sleep mode or a normal mode, through a channel that transmits system information. That is, the UE connected with the BS may determine whether the BS operates in the sleep mode or in the normal mode, by receiving the indicator transmitted by the corresponding BS. Also, other BSs adjacent to the corresponding BS may receive the indicator transmitted by the corresponding BS, and may determine the mode of the corresponding BS. When the indicator is difficult to be transmitted through the channel that transmits the system information, an indicator indicates a mode of a target BS (or a micro BS) to which the UE attempts connection, from a currently connected macro BS.

Figure 3:
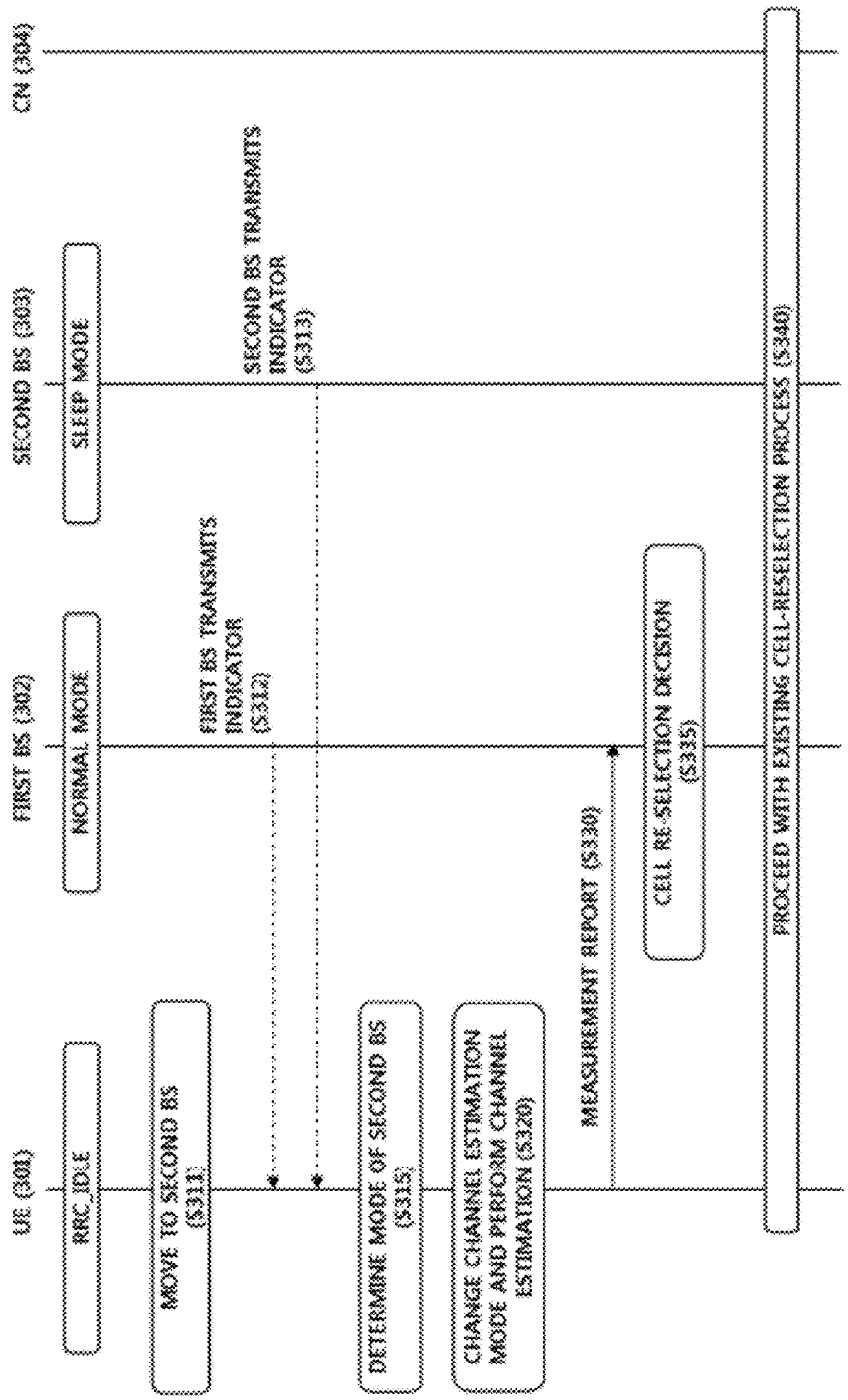
FIG. 3 is a diagram illustrating a case in which a user equipment (UE) moves to a cell of a BS that operates in a sleep mode according to an embodiment of the present invention.

When the indicator as described in the foregoing does not exist, the UE may determine a cell where the UE currently belongs to by interpreting a signal used as a reference for a location, and may perform determination based on neighbor cell information transmitted from the macro BS based on whether the corresponding cell operates in the sleep mode or in the normal mode. In this example, when the macro BS transmits neighbor cell information, the macro BS may include mode information of each cell in the neighbor cell information. FIGS. 3 through 5 will describe a case in which an indicator exists. In a case of a system that does not include an indicator, a functional block may be used so that the UE determines whether a current cell is in the sleep mode or the normal mode based on information used as a reference for a location or information received from a currently connected macro cell, instead of receiving the indicator.

As another method, an eDTX mode may be operated without transmitting, to the UE, an indicator indicating a current mode (a sleep mode or a normal mode) of the BS. In this example, the UE may need a reception structure that may perform reception without being affected by an existing eDTX or DTX scheme. Although the complexity of the reception structure increases, a separate indicator may not be required.

FIG. 3 illustrates a case in which a UE moves to a cell of a BS that operates in a sleep mode according to an embodiment of the present invention.

Referring to FIG. 3, a first BS 302 may be a source cell with which the UE currently maintains a connection, and a second BS 303 may operate in a sleep mode and may be a target cell to which the UE attempts a connection through movement. Before performing the process, the UE according to an embodiment of the present invention may be in a connection with the first BS, and may smoothly receive a signal from the first BS.

When the configuration of FIG. 2 is applied, the second BS 303 may be a micro cell such as a pico cell, and a hotspot. The first BS 302 may be a macro cell. The configuration may be applicable to FIGS. 3, 4, and 5, in common. In addition, this may be applicable to neighbor cells of FIG. 6.

In FIGS. 3, 4, and 5, the UE may have two modes. An RRC_Connected mode may indicate that the UE establishes a radio resource control (RRC) connection. An RRC_Idle mode may indicate that the UE does not establish an RRC connection. In the RRC_Idle mode, the UE may not independently transmit or receive data, but data transmitted to the entire network may be transmitted or received (for example, data that is broadcasted or multicasted. Also, the UE may perform monitoring of a state of a network, and may proceed with cell-reselection for a handover.

In the RRC_Connected mode, independent data transmission and reception may be performed between the UE and the BS, and transmission and reception of data transmitted to the entire network may also be performed (for example, data that is broadcasted or multicasted). The RRC_Idle mode and the RRC_Connected mode may be an embodiment of a process that uses a communication network of the UE, and may include a protocol to control a radio resource between the BS and the UE.

A UE 301 may be in the RRC_Idle mode, the first BS 302 may be in a normal mode, and the second BS 303 may be in a sleep mode.

The UE may move from the first BS 302 operating in the sleep mode to the second BS 303. The UE is in the RRC_Idle mode and thus, the UE may not perform transmission and reception of data, and may not require a signal to be used for decoding data (for example, a signal to be used for channel estimation such as a CRS). Therefore, without changing a mode of the second BS 303 operating in the sleep mode into the normal mode, the second BS 303 may transmit only a signal required for a broadcasting channel and synchronization estimation, and may maintain the current mode (step S311).

When an indicator transmitted from the second BS 303 exits, the UE 301 may receive the indicator (step S313). The UE 301 may receive an indicator from the first BS 302 (step S312). The indicator may correspond to indication information associated with whether a current mode of the BS is the sleep mode or the normal mode. Both cases may be applicable only when an indicator exists.

The UE may determine whether the second BS 303 operates in the sleep mode or in the normal mode, based on the received indicator (step 315). When the second BS 303 operates in the sleep mode, a signal (a channel estimation signal (CRS)) that determines a channel of a cell may be infrequently transmitted from the BS at intervals longer than that of the normal mode for saving energy and thus, the UE may attempt channel estimation based on a channel estimation scheme appropriate for the infrequently transmitted channel estimation signal (step S320).

The UE may transmit a measurement value associated with the estimated signal to the first BS 302 (step 330). The first BS may determine cell-reselection (step S335), and may proceed with the cell-reselection with respect to the second BS 303 (step S340). The cell-reselection may be a process in which the UE checks a signal of another cell in a predetermined cell, and determines whether the strength of the signal from the other cell is appropriate. The cell-reselection may maintain a connection with the predetermined cell, and may determine a signal of a neighbor cell.

FIG. 4 illustrates a process in which a UE that connects with a BS that operates in a sleep mode changes a connection mode into an RRC_connected mode according to an embodiment of the present invention.

A UE 401 may be in an RRC_Idle mode, and may connect with a second BS operating in a sleep mode. Before connecting with the second BS, the UE according to an embodiment of the present invention has a connection with a first BS and may smoothly receive a signal from the first BS.

The UE 401 may attempt transmission and reception of data in a cell that operates in the sleep mode, so as to change a mode into an RRC_Connected mode (step S411). The UE 401 may request resources required for transmission and reception of data from a BS operating in the sleep mode (step S412).

The second BS 403 that is requested to allocate resources by the UE may change the mode from the sleep mode to a normal mode (step S413), and the second BS 403 that changes the mode from the sleep mode to the normal mode may transmit, to a CN 404, a mode status change message indicating that the mode is changed from the sleep mode to the normal mode (step S414). In this process, list information associated with connected UEs may be also transmitted to the CN 404. The second BS 403 may receive a response (ACK) in response to the mode status change message from the CN 404 (step S415), and may select resources to be allocated to the UE, and may transmit a message associated with mobility. In this example, an indicator may be selectively included in the message (step S420). The indicator may be indication information indicating whether a current mode of the BS is the sleep mode or the normal mode.

An example of the message associated with the mobility may include mobilitycontrolInformation, which is a message used when a BS (a source eNB) that connects with the UE transmits, to the UE, information associated with a BS (a target eNB) with which the UE is to be connected through a handover. In this example, identity information of the BS to be connected with, and frequency information of the corresponding BS may be selectively provided.

When an indicator indicating that the second BS 403 changes the mode from the sleep mode to the normal mode exists, the UE may receive and check the indicator, and may change a channel estimation scheme to a channel estimation scheme used in a cell of the normal mode and perform channel estimation (step S421). The indicator may be indication information indicating whether a current mode of the BS is the sleep mode or the normal mode.

The UE 401 and the second BS 403 may transmit and receive packet data based on the allocated resources (step S422). Upon completing the transmission and reception (step S425), the second BS 403 may attempt to change the mode into the sleep mode at CN 404 (step S426). In addition to a case where transmission and reception of data with the UE 401 is completed and resource allocation for transmission and reception of data is not performed with respect to the UE 401, when the UE 401 performs a handover to another BS and receives a handover complete message, the second BS 403 may attempt to change the mode into the sleep mode at CN 404 (step S426).

The second BS 403 that changes the mode from the normal mode to the sleep mode may inform the CN 404 that the second BS 403 changes the mode from the normal mode to the sleep mode through use of the mode status change message, and may selectively inform the CN 404 that it is a null state where a connected UE does not exist (step S427). In the process, the second BS may receive a response (ACK) in response to the mode status change message from the CN 404 (step S428), and may change the mode into the sleep mode (step S430). The response messages received in steps S415 and S428 may include information on whether the CN allows or disallows changing of the mode. When the response message transmitted from the CN is a NACK message that disallows changing of the mode, the BS may not perform changing of the mode.

FIG. 5 illustrates a process in which a UE 501 proceeds with a handover to a BS that operates in a sleep mode according to an embodiment of the present invention.

The UE 501 may move to a second BS 503 operating in a sleep mode while being in an RRC_connected mode with the first BS 502 (step S511). Before performing the process, the UE according to an embodiment of the present invention has a connection with the first BS, and smoothly receives a signal from the first BS. The second BS 503 operating in the sleep mode infrequently transmits a signal required for channel estimation and thus, the UE 501 may not immediately proceed with a handover to the second BS 503.

When an indicator indicating a mode of the second BS 503 is receivable from the second BS 503 or the first BS 502, the UE 501 may receive the indicator (steps S512 and S513).

Whether the second BS 503 operates in the sleep mode or in a normal mode may be determined based on the received indicator (step S515). When the second BS 503 operates in the sleep mode, a channel estimation signal is infrequently transmitted from the second BS 503 at intervals longer than that of the normal mode for saving energy and thus, the UE 501 may attempt channel estimation based on a channel estimation signal scheme of the infrequently transmitted signal (step S520). When the indicator does not exist, the normal mode and the sleep mode are not distinguished and thus, the UE 501 may attempt channel estimation based on a reception structure that may be used in both the sleep mode and the normal mode in common. In this example, channel estimation may be performed without using the indicator, and the reception structure may become complex.

After completing the channel estimation, the UE 501 may transmit a measurement message to the first BS 502 (step S530).

The first BS 502 that receives a measurement control message reported from the UE 501 may determine a handover when a signal is measured to be a higher power than a predetermined threshold, that is, when a signal power of the second BS 503 is reported to be higher than a predetermined threshold (step S540). The first BS 502 may transmit a handover request message to the second BS 503 so as to request a handover of the UE 501 (step S541).

The second BS 503 that receives the handover request message may perform admission control (AC) that allows connection with an area of the second BS 503, and may attempt to change a mode into the normal mode (step S542). In the process, when the second BS 503 operates in the normal mode, changing of the mode into the normal mode may not be separately performed.

The second BS 503 may change the mode from the sleep mode into the normal mode, may start transmitting a signal associated with channel estimation, and then may transmit, to the CN 504, a mode status change message indicating that the mode of the second BS 503 is changed from the sleep mode to the normal mode, and may selectively transmit list information of connected UEs 501 to the CN 504 (step S543). Then, the second BS 503 may receive a response message (ACK) in response to the mode status change message from the CN 504 (step S544).

The second BS 503 may transmit the response to the first BS 502 in response to the handover request in step S541 (step S550). The first BS 502 may allocate a DL to the UE 501 (step S522), and may transmit information required for the handover. As an example of the required information, an RRC reconfiguration may be instructed through an RRC connection reconfiguration message (RRC conn. Reconfig.) and an indicator indicating a mode status of the second BS 503 may be transmitted through a predetermined message (mobility-ControlInformation message) (step S553).

The UE 501 that receives the RRC reconfiguration message from the first BS 502 may proceed with the handover based on an existing procedure, and the UE 501 may receive an indicator and may perform channel estimation based on a changed mode status (step S560). The second BS 503 may receive a message (HO_Complete) indicating that the handover is completed, from the UE (step S561). Subsequently, the UE 501 may perform transmission and reception of packet data with the second BS 503 (step S562). When transmission and reception of the packet data of step S562 is completed (step S570) and DL resource allocation is no longer required or when the UE 501 performs a handover by moving to another BS and receives a handover complete message, the corresponding second BS 503 may attempt to change the mode into the sleep mode again (step S572), and may transmit, to the CN 504, a mode status change message indicating that the mode is changed from the normal mode to the sleep mode (step S581). In this example, the second BS 503 may selectively indicate that it is a null state where a connected UE does not exist.

The second BS 503 may receive a response (ACK) from the CN 504 in response to changing of the sleep mode (step S581), and the second BS may convert the mode into the sleep mode (step S590). The response message received in steps S544 and S581 may include information associated with whether the CN allows or disallows changing of the mode. When the response message transmitted from the CN is an NACK message that disallows changing of the mode, the BS may not perform changing of the mode.

As described in FIGS. 4 and 5, the second BS 403 and 504 may transmit information associated with a mode status and list information associated with connected UEs to the CN 404 and 504, in the process that changes a mode between the sleep mode and the normal mode. The information may be simultaneously managed by each BS and the CN 404 and 504, and may be cross-checked at predetermined intervals or every time that a change occurs and thus, the stability may be improved. The interval may be determined based on an environment of the system. Also, the CN 404 and 504 may determine whether a mode status of each BS is valid by comparing to location information of UEs that may be periodically updated through TA updating or a paging message.

FIG. 6 illustrates an example of changing modes of BSs according to another embodiment of the present invention. FIG. 6 shows a process of changing a mode when a BS has a probability of being connected with a UE, unlike a case that changes a mode when the UE is connected as shown in FIGS. 3, 4, and 5.

681 of FIG. 6 shows a configuration of cells set to be a sleep mode based on other neighbor cells that do not include UEs.

A range 611 of a center cell A 601 and neighbor cells adjacent to the range 611 (including B 602 and included in a range 612), and cells (for example C 603) included in a range 613 adjacent to the neighbor cells of the center cell may operate in the sleep mode.

The range 611 of FIG. 6 may be referred to as a center cell, the range 612 may be referred to as a primary neighbor cell, and the range 613 may be referred to as a secondary neighbor cell.

A change occurring when the UE enters another cell may be as shown in 682. 682 of FIG. 6 shows a case in which a UE 650 enters C 603, which is one of the secondary neighbor cells. In this example, neighbor cells 602, 622, 623, and 633 of C 603 that senses the UE 650 may attempt to change their modes from the sleep mode to the normal mode in advance, by taking into consideration that the UE 650 is capable of performing a handover to any of the corresponding cells at any time. A process of changing the mode may be as follows.

When a UE enters a predetermined cell or is turned on, the corresponding cell may sense the UE and may request neighbor cells to change their modes into the normal mode. In 682, when the UE 650 enters C 603, neighbor cells B 602, B1 622, C1 623, and C2 633 may be requested to change their modes into the normal mode.

The request for changing the mode into the normal mode may be directly requested through an interface with a BS, or may be transmitted to a CN and the CN may request corresponding neighbor cells to change their modes.

The neighbor cells B 602, B1 622, C1 623, and C2 633 which are requested to change their modes into the normal mode may attempt to change the modes, and may transmit messages indicating the mode is changed into the normal mode to the CN after the changing of the mode is completed.

When the UE 650 moves to another cell from C 603, cells that do not correspond to neighbor cells based on a location of the cell to which the UE 650 moves, may attempt to change their mode into the sleep mode again. In this example, the procedure may be performed in the same manner as described in the embodiments of the present invention.

According to an embodiment of FIG. 6, switching between the sleep mode and the normal mode may be quickly performed, and the embodiment may be applicable to an environment where only a macro BS exists as opposed to a case in which a macro BS and a micro BS exist together as shown in FIGS. 3, 4, and 5.

Figure 7:
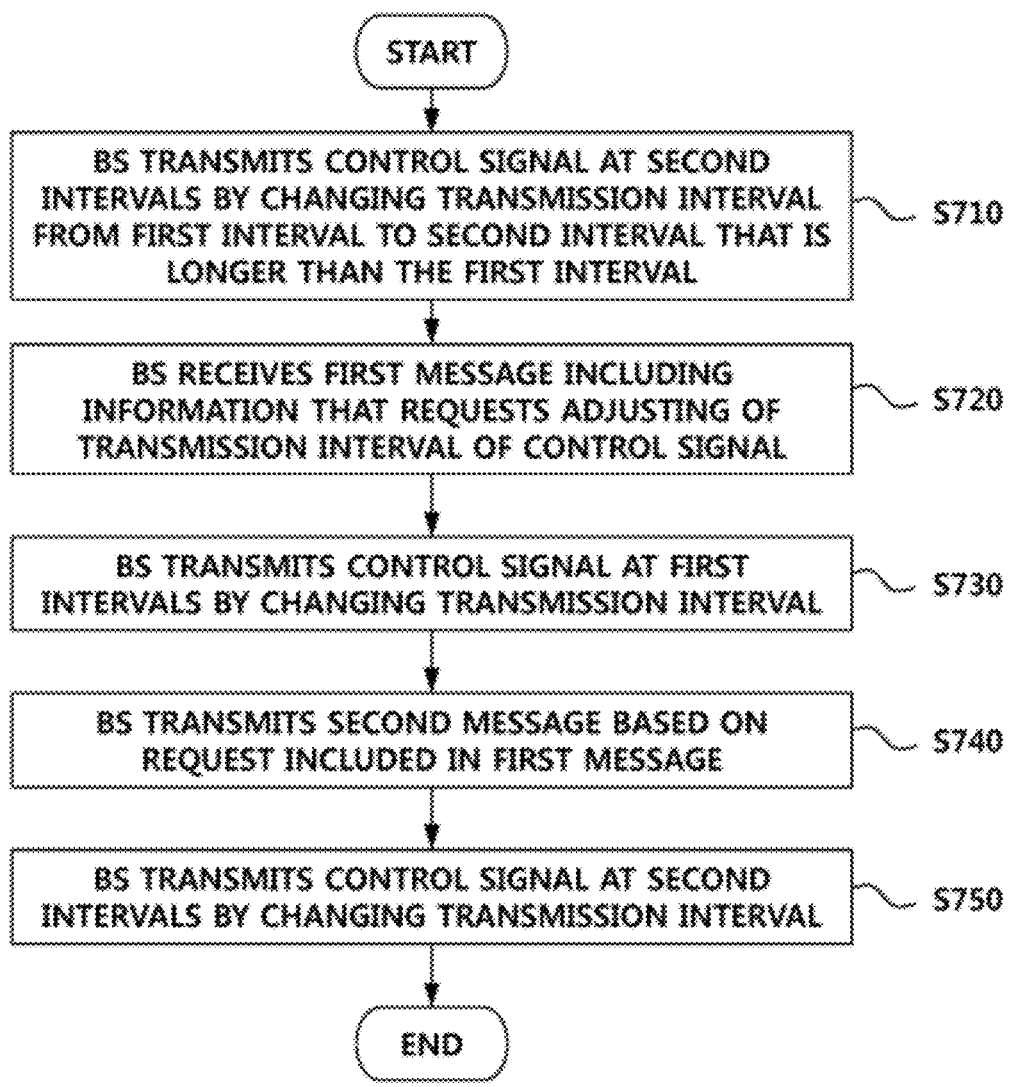
FIG. 7 is a diagram illustrating a process in which a BS transmits control information and performs transmission and reception of data with a UE according to an embodiment of the present invention.

FIG. 7 illustrates a process in which a BS transmits control information and performs transmission and reception of data with a UE according to an embodiment of the present invention. FIG. 7 shows a process in which the BS transmits and receives a message, and adjusts a transmission interval of a control signal.

The BS of FIG. 7 may include a BS configuring a micro cell of FIG. 2, and may include a second BS of FIGS. 3, 4, and 5 that is provided as an embodiment of the present invention. The BS may include BSs (B 602, B1 622, C1 623, and C2 633) that change modes when a UE connects with a neighbor cell in 682 of FIG. 6. Therefore, as described in the foregoing, the BS may adjust a transmission interval of a control signal based on a network connection state of the UE, a current mode of the UE, or an external condition, so as to increase or decrease a transmission power. Here, decreasing of the transmission power of the BS may include decreasing the transmission power to 0. First, as described in the foregoing, the BS may change a mode into a sleep mode as shown in FIGS. 3, 4, and 5. For this, the BS may change a transmission interval of a control signal that is transmitted at first intervals to a second interval that is longer than the first interval, and transmits the control signal at second intervals (step S710). The transmission interval of the control signal may be distinguished as the first interval and the second interval. As described in the foregoing, the sleep mode that infrequently transmits a control signal such as a channel estimation signal may be an example of transmission at second intervals. The first interval may include an interval of transmission of a channel estimation signal in a normal mode of the BS. The control signal may include signals, of which a transmission interval is selectively adjusted based on a mobile communication protocol, in addition to the channel estimation signal.

In the process of operating in the sleep mode, the BS may receive a first message including information that requests adjusting of the transmission interval of the control signal (step S720). The first message may be received from a BS of a neighbor cell, and may be received from the UE, and may be received from a CN. The first message may directly request adjusting of the transmission interval, or may request a function that requires adjusting of the transmission interval of the control signal, and accordingly, may need to adjust the transmission interval. As described in the foregoing, information that requests resource allocation and a handover may be included in the first message. A mode may be changed to perform the request. As described in FIG. 4, an example of the first message may be a message that is transmitted by the UE that connects with the BS so as to request resource allocation for transmission and reception of data. The first message may be a message that is transmitted from another BS adjacent to the BS so as to request a handover of the UE, as shown in FIG. 5. Also, the first message may be a message that is transmitted from another BS adjacent to the BS so as to report that the UE connects with the adjacent BS, as shown in FIG. 6. In this example, the BS may transmit a control signal at first intervals. The first interval may include transmission in the normal mode as described in the foregoing. When the UE proceeds with a handover for transmission and reception of data, or when the UE connects with an adjacent BS and a control signal such as a channel estimation signal needs to be transmitted at transmission intervals of the normal mode, the BS may change the transmission mode of the control signal into the first interval and may transmit the control signal at the first intervals (step S730). Through the control signal transmitted at the first intervals, an operation requested by the first message or an operation that the first message attempts to perform may be performed.

The BS may transmit a second message based on a request included in the first message (step S740). When the first message is a message used when the UE requests resource allocation required for transmission and reception of data, the second message may include information required for the resource allocation for the UE. When the first message requests a handover of the UE, the second message may be a handover response message (Handover ACK) so that the handover may be performed. The handover request message may be received from an adjacent BS with which the UE that is to perform the handover is connected. Also, the second message may be a mode change message to be transmitted to a CN, so as to change a mode.

When the operations requested or required by the first message are completed, the BS may change the transmission interval of the control signal that is transmitted at first intervals so as to transmit the control signal at second intervals (step S750). The completion of the requested operation may include a case where the control signal may not need to be transmitted at the first intervals since an operation that requires transmission of the control signal at the first intervals such as a handover and the like is completed.

In a process of changing the transmission interval of the control signal into the first interval or the second interval, a mode change request message indicating that the BS is to change the transmission interval of the control signal may be transmitted to the CN that controls the BS. The process may include a process in which the second BS transmits a mode status change message to the CN during a process of changing the sleep mode into the normal mode or changing the normal mode into the sleep mode of FIGS. 4 and 5, and the second BS receives a response message in response to the mode status change message. In this example, the mode change request message may include information associated with the UE that connects with the BS.

Also, the BS may transmit indication information indicating that the control signal is transmitted at the second intervals so that the mode information of the BS may be transmitted to the UE that attempts to determine the mode of the BS that already operates in the sleep mode. The indication information may be transmitted from the BS operating in the sleep mode, or may be transmitted from a macro BS that is adjacent to the BS or including the BS.

FIG. 8 illustrates an architecture in which a BS generates and transmits control information according to an embodiment of the present invention.

A transmission interval determining unit 803 may determine the transmission of a control signal at first intervals or second intervals, and may generate the control signal. The transmission interval determining unit 803 may transfer information to resource element (RE) mappers 850 through 859, so as to perform mapping on the RE based on a transmission interval of the control signal. The second interval is longer than the first interval. An example of the transmission at the second intervals may be a sleep mode, and an example of the transmission as the first intervals may be a normal mode.

Also, a transmission interval information transceiving unit 880 may transmit information associated with changing of the transmission interval of the control signal, determined by the transmission interval determining unit 803, to a CN that controls the BS, through a mode change request message indicating that the BS is to change the transmission interval of the control signal, and may receive a response message transmitted from the CN in response to the mode change request message. In this example, information associated with a connected UE may be transmitted together with the mode change request message, as shown in FIGS. 4 and 5.

A receiving unit 890 may receive, from the UE or an adjacent BS, a wireless or wired signal including information. The received signal may include a first message including information that requests adjusting of the transmission interval of the control signal. The first message may be received from a neighbor cell, and may be received from the UE, and may be received from the CN.

For example, as described in FIG. 4, the first message may be a message used when the UE that connects with the BS requests resource allocation for transmission and reception of data. The first message may be a message used when another BS adjacent to the BS requests a handover of the UE, as shown in FIG. 5. The first message may be a message used when another BS adjacent to the BS reports that the UE connects with the adjacent BS, as shown in FIG. 6. The received message may be used when the transmission interval determining unit 803 determines the transmission interval of the control signal to be the first interval.

Information that the BS desires to transmit may be generated to be a codeword by a codeword generating unit 805, and the generated codeword may be scrambled by scrambling units 810 through 819. The blocks of scrambled bits may be modulated to be a symbol by modulation mappers 820 through 829 based on a predetermined modulation scheme. The modulation may include BPSK, QPSK, and the like. In a case of a PDCCH, modulation may be performed through the QPSK.

The modulated symbol may be mapped to various layers by a layer mapper 830. In this process, when a single antenna port is used for transmission, the symbol may be mapped to a single layer for transmission. Conversely, when a plurality of antenna ports is used for transmission, a multi-antenna transmission scheme may be used. The layer mapping may be performed through use of the multi-antenna transmission scheme such as a spatial multiplexing or a transmit diversity.

When the layer mapping is completed, a precoding unit 840 may generate a vector block so that mapping is performed on resources based on a mapping scheme of an antenna port. A precoding scheme may be determined based on a number of antennas determined by the layer mapping and a multi-antenna mapping scheme.

When the precoding is completed, the RE mappers 850 through 859 may perform mapping with respect to REs. As described in the foregoing, to adjust the transmission interval of the control signal, the control signal may be mapped by the RE mapper based on the transmission interval. When the mapping is completed, OFDMs generated by OFDM signal generators 860 through 869 may be transmitted through an antenna port of a transmitting unit 875.

The signal generating process of FIG. 8 may be included in a single module. As described in FIG. 8, the codeword generating unit 805, the scrambling units 810 through 819, the modulation mappers 820 through 829, the layer mapper 830, the precoding unit 840, the RE mappers 850 through 859, the OFDM signal generating units 860 through 869 may be included in the signal generating unit 870 as separate modules, or two or more of them may be coupled to function as a single module.

FIG. 9 illustrates a functional process when channel estimation infrequently occurs in a UE according to an embodiment of the present invention. FIG. 9 shows a process in which the UE transmits or receives a message.

When the UE receives a control signal transmitted from a BS, the BS may transmit the control signal at first intervals or second intervals, the second interval being longer than the first interval. This may indicate a situation in which the BS infrequently transmits the control signal, such as transmission in a sleep mode. The UE may receive indication information including information associated with a transmission interval of the control signal (step S910). As described in FIGS. 3 and 5, the indication information may be received from a second BS. The indication information may be received from a first BS that is different from the second BS. Therefore, the indication information may be received from the BS or another BS (the first BS of FIGS. 3 and 5) that is adjacent to the BS.

In addition, the indication information may include information associated with a plurality of cells adjacent to a macro BS, as opposed to mode information of a predetermined BS.

That is, the cell information of a plurality of adjacent BSs may be received from the first BS that is the macro BS that is adjacent to the second BS and includes a wider signal area than the second BS, and whether a current BS is in a sleep mode or in a normal mode may be determined based on the corresponding information.

In a process of a handover and resource allocation of FIGS. 3, 4, and 5, the second BS may change the transmission interval of the control signal from the second interval to the first interval, and the UE may receive the control signal transmitted at the first intervals and may determine channel information associated with the corresponding BS (step S920). The UE and the BS may perform transmission and reception of predetermined control information or data information, based on the received channel information (step S930).

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method for reducing transmission power consumption in a base station (BS) by adjusting a transmission interval of a control signal, the method comprising:
   transmitting, by the BS, the control signal at second intervals by changing the transmission interval of the control signal from a first interval into a second interval that is longer than the first interval;
   receiving a first message including information that requests adjusting of the transmission interval of the control signal; and
   transmitting the control signal at the first intervals by changing the transmission interval into the first interval,
   wherein, before changing of the transmission interval of the control signal, the method comprises:
   transmitting a mode change request message indicating that the BS is to change the transmission interval of the control signal to a core network (CN) that controls the BS; and
   receiving, from the CN, a response message in response to the message.

2. The method as claimed in claim 1, further comprising:
   transmitting a second message in response to a request included in the first message; and
   transmitting the control signal at the second intervals by changing the transmission interval into the second interval.

3. The method as claimed in claim 1, wherein the response message received from the CN includes information associated with whether the CN allows changing of the transmission interval of the control signal; and
   the BS changes the transmission interval of the control signal if the response message allows changing of the transmission interval.

4. The method as claimed in claim 1, further comprising:
   transmitting indication information indicating that the control signal is transmitted at second intervals.

5. The method as claimed in claim 1, further comprising:
   transmitting a second message in response to a request included in the first message,
   wherein the first message corresponds to a message that is used when a user equipment (UE) that connects with the BS requests resource allocation for transmission and reception of data; and
   the second message includes information required for the resource allocation to the UE.

6. The method as claimed in claim 1, wherein the first message further comprises information that requests a handover of a user equipment (UE), transmitted from an adjacent BS.

7. The method as claimed in claim 1, wherein the first message is transmitted from another BS adjacent to the BS, and further comprises information indicating that a user equipment (UE) connects with the adjacent BS.

8. A method for receiving a control signal of which a transmission interval is adjusted to a first interval or to a second interval that is longer than the first interval, from a base station (BS), the method comprising:
receiving, by a user equipment (UE), indication information including information associated with the transmission interval of the control signal;
determining channel information associated with the BS by receiving, from the BS, the control signal transmitted at the first interval; and
performing transmission and reception of reference control information or data information with the BS,
wherein, before the transmission interval is adjusted to the first interval or to the second interval, the method comprises:
transmitting a mode change request message indicating that the BS is to change the transmission interval of the control signal to a core network (CN) that controls the BS; and
receiving, from the CN, a response message in response to the message.

9. The method as claimed in claim 8, wherein receiving of the indication information comprises:
receiving the indication information from the BS or another BS adjacent to the BS.

10. The method as claimed in claim 8, wherein receiving of the indication information comprises:
receiving the indication information from a macro base station that is adjacent to the BS and includes a wider signal area than the BS,
wherein the indication information includes mode information of a cell of a BS adjacent to the macro BS.

11. The method as claimed in claim 8, wherein, before receiving of the indication information, the method comprises:
receiving a separate control signal from another BS adjacent to the BS.

12. A base station (BS) to reduce transmission power consumption by adjusting a transmission interval of a control signal, the BS comprising:
a transmission interval determining unit to determine the transmission of the control signal at first intervals or second intervals;
a signal generating unit to generate the control signal at the transmission intervals determined by the transmission interval determining unit;
a transmitting unit to transmit the generated signal;
a transmission interval information transceiving unit to transmit, to a core network (CN) that controls the BS, a mode change request message including information associated with changing of the transmission interval of the control signal, determined by the transmission interval determining unit, and to receive a response message from the CN in response to the message; and
a receiving unit to receive a first message including information that requests adjusting of the transmission interval of the control signal,
wherein the transmission interval determining unit changes the transmission interval of the control signal into the first interval when the receiving unit receives the first message.

13. The BS as claimed in claim 12, wherein the transmitting unit transmits indication information indicating that the control signal is transmitted at second intervals.

14. The BS as claimed in claim 12, wherein the response message received from the CN includes information associated with whether the CN allows changing of the transmission interval of the control signal; and
the transmission interval determining unit changes the transmission interval of the control signal if the response message allows changing of the transmission interval.

15. A method for reducing transmission power consumption of a base station (BS) by adjusting a transmission interval of a control signal, the method comprising:
transmitting, by the BS, the control signal at second intervals; and
proceeding with cell re-selection with a user equipment (UE) that receives the control signal that is being transmitted,
wherein the BS transmits the control signal based on one of a first interval and a second interval that is longer than the first interval, and
wherein, before the transmission interval is adjusted, the method comprises:
transmitting a mode change request message indicating that the BS is to change the transmission interval of the control signal to a core network (CN) that controls the BS; and
receiving, from the CN, a response message in response to the message.

16. A method for reducing transmission power consumption in a base station (BS) by adjusting a transmission interval of a control signal, the method comprising:
transmitting, by the BS, the control signal at second intervals;
receiving a message that requests resource allocation, from a user equipment (UE);
transmitting, to a core network (CN) that controls the BS, a mode change request message including information associated with changing of the transmission interval of the control signal;
receiving, from the CN, a response message in response to the mode change request message;
transmitting the control signal at first intervals; and
performing transmission and reception of packet data with the UE,
wherein the second interval is longer than the first interval.

17. The method as claimed in claim 16, wherein, after performing of the transmission and reception of the packet data, the method further comprises:
transmitting a mode change request message to the CN, and receiving, from the CN, a response message in response to the message; and
transmitting the control signal at second intervals.

18. The method as claimed in claim 17, wherein, after performing transmission and reception of the packet data, the method further comprises:
transmitting a mode change request message to the CN, and receiving, from the CN, a response message in response to the message; and
transmitting the control signal at second intervals.

19. The method as claimed in claim 18, wherein the response message received from the CN includes information associated with whether the CN allows changing of the transmission interval of the control signal; and
the BS changes the transmission interval of the control signal if the response message allows changing of the transmission interval.

20. The method as claimed in claim 17, wherein the response message includes information associated with whether the CN allows changing of the transmission interval of the control signal; and the BS changes the transmission interval of the control signal if the response message allows changing of the transmission interval.

21. The method as claimed in claim 16, wherein the response message includes information associated with whether the CN allows changing of the transmission interval of the control signal; and the BS changes the transmission interval of the control signal if the response message allows changing of the transmission interval.

22. A method for reducing transmission power consumption in a base station (BS) by adjusting a transmission interval of a control signal, the method comprising:

transmitting, by the BS, the control signal at second intervals;

receiving a message that requests a handover from a second BS that connects with a user equipment (UE);

transmitting, to a core network (CN) that controls the BS, a mode change request message including information associated with changing of the transmission interval of the control signal;

receiving, from the CN, a response message in response to the mode change request message;

transmitting the control signal at first intervals;

transmitting, to the second BS, a response message in response to the message that requests the handover;

completing the handover with the UE; and performing transmission and reception of packet data with the UE, wherein the second interval is longer than the first interval.

23. The method as claimed in claim 22, wherein the response message received from the CN includes information associated with whether the CN allows changing of the transmission interval of the control signal; and the BS changes the transmission interval of the control signal if the response message allows changing of the transmission interval.

* * * * *